Figure 1:
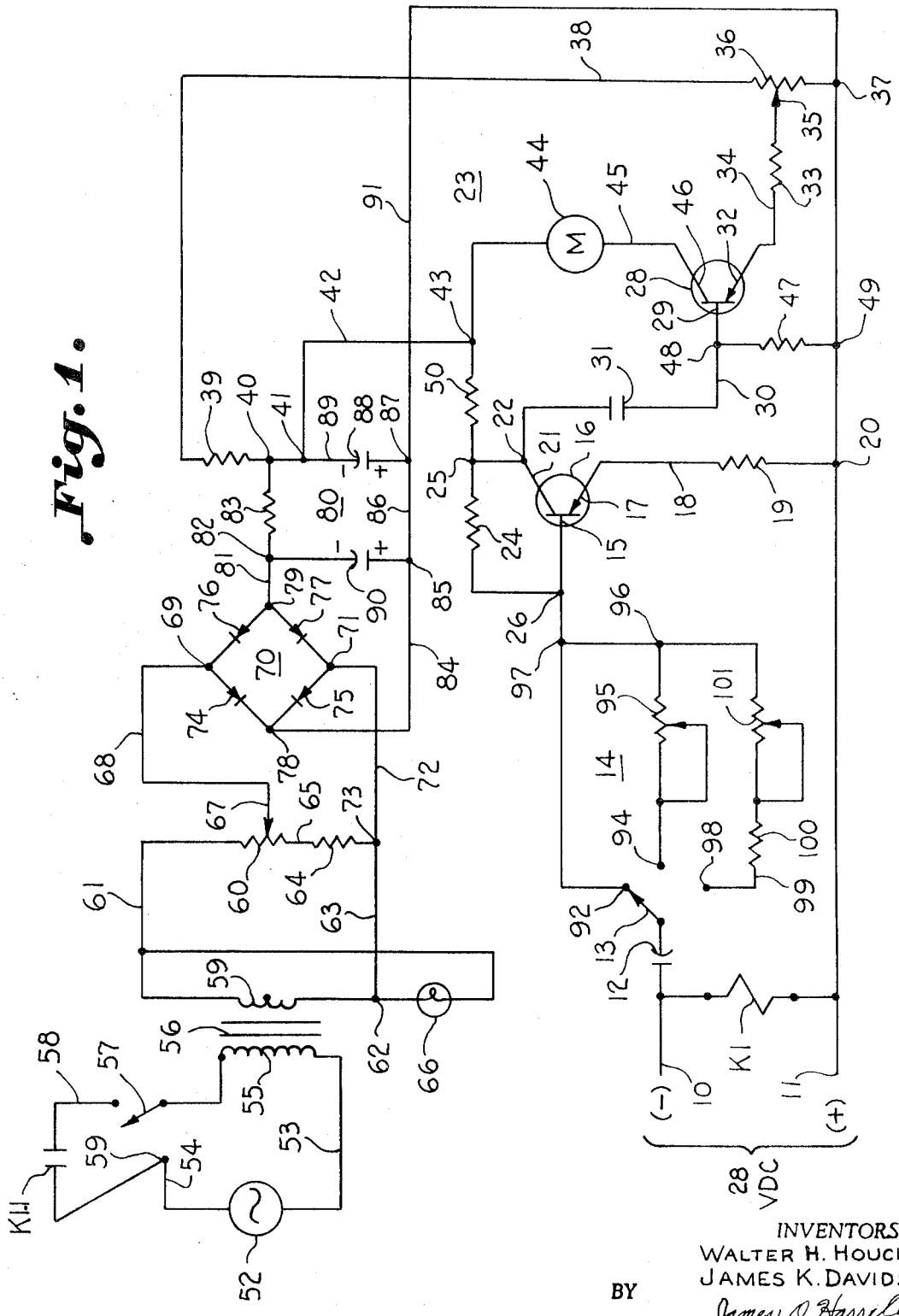

United States Patent

[11] 3,593,132

[72] Inventors Walter H. Houck;
James K. Davidson, both of Titusville, Fla.
[21] Appl. No. 817,481
[22] Filed Apr. 18, 1969
[45] Patented July 13, 1971
[73] Assignee The United States of America as represented by the Administrator of the National Aeronautics and Space Administration

[54] RIPPLE INDICATOR
6 Claims, 1 Drawing Fig.
[52] U.S. Cl. .................................................. 324/102, 324/119, 324/123 R
[51] Int. Cl. ........................................... G01r 19/00, G01r 19/22
[50] Field of Search .................................. 324/123, 119, 102, 76; 329/101, 102, 103; 307/235; 321/10, 12; 317/33, 52

[56] References Cited
UNITED STATES PATENTS
2,890,352  6/1959  Goodrich ..................... 307/235
3,435,294  3/1969  Lemma ........................ 317/33 X
3,510,753  5/1970  Lawn ........................... 321/10 X
FOREIGN PATENTS
1,271,255  6/1968  Germany ..................... 324/102

Primary Examiner—Rudolph V. Rolinec
Assistant Examiner—Ernest F. Karlsen
Attorneys—James O. Harrell and G. T. McCoy ABSTRACT: A circuit for monitoring a power supply so as to determine when the voltage level of the power supply deviates. The circuit includes an isolating capacitor which blocks the DC portion of the power supply and allows the AC ripple to pass therethrough. This AC ripple is fed to a balanced circuit which detects variations therein for indicating when the power supply deviates from a predetermined level.

PATENTED JUL 13 1971 3,593,132

INVENTORS.
WALTER H. HOUCK &
JAMES K. DAVIDSON

BY
James O. Harrell
9 Hm C C
ATTORNEYS.

RIPPLE INDICATOR

This invention described herein was made by employees of the U.S. government, and may be manufactured and used by or for the government for governmental purposes without the payment of any royalties thereon or therefor.

This invention relates to a circuit for monitoring the AC ripple voltage of a DC power supply so as to detect variations in the power supply.

There are many situations which incorporate a power supply that it is essential that the voltage level of the power supply does not deviate from a predetermined level. One particular situation is in connection with space vehicles where it is essential that prior to launch a constant voltage be maintained on the equipment within the space vehicle so that such remains in an operating state. For example, it is necessary to maintain power on certain relays so that they do not become deenergized prior to launch. After the vehicle has been launched there is no problem, since the internal batteries on the vehicle take over. Once in orbit, solar panels would then supply power to the space vehicle.

Of course, it is to be understood that the ripple indicator constructed in accordance with the present invention can be used to modify any voltage source, and the above is merely one application of such. It has been found that the ripple voltage associated with a DC power source varies proportionally with variations in the DC portion of the signal, Therefore, by monitoring the ripple voltage any deviations which take place in the DC portion can be detected.

In accordance with the present invention it has been found that in monitoring a power supply so as to determine deviation from a predetermined level such can be accomplished by a ripple voltage indicator constructed in accordance with the present invention. This ripple voltage indicator includes the following basic parts: 1. a balanced circuit; 2. an isolation capacitor means interposed between the DC power supply being monitored and said balanced circuit for isolating the DC component of said power supply from said balanced circuit while passing the ripple voltage to the balanced circuit; 3. a transistor having base, emitter, and collector electrodes interposed in the balanced circuit, said base electrodes being coupled to the isolation capacitor for receiving the ripple voltage; 4. an ammeter connected between the emitter and collector electrodes for indicating changes in the current flow through the balanced circuit responsive to variations in the ripple voltage being supplied to the base electrode; 5. a source of power coupled to the balanced circuit; 6. first adjustable means coupled to the source of power for adjusting the voltage level of the source of power to set the ammeter; 7. second adjustable means interposed in the balanced circuit for adjusting the ammeter,. Thus, variations in the DC power supply are detected by monitoring the ripple voltage associated therewith, which causes the conduction of the transistor to vary according, to produce a corresponding change in the current flow in the balanced circuit.

Accordingly, it is an important object of the present invention to provide an electrical apparatus for determining variations in the amplitude of a DC power supply by monitoring the ripple voltage associated therewith.

Another important object of the present invention is to provide a simple and efficient electrical apparatus which will accurately indicate variations in a DC power supply.

Other objects and advantages of this invention will become more apparent from a reading of the following detailed description and appended claims taken in conjunction with the accompanying drawing wherein:

FIG. 1 is a schematic diagram of the ripple voltage indicator.

Referring in more detail to the drawing, the DC power supply which is to be monitored is connected to leads 10 and 11 and the DC portion of the power supply is blocked by an isolating capacitor 12. This isolating capacitor permits the ripple voltage associated with the DC power supply to pass therethrough. It has been found that the ripple voltage varies proportionally with the DC portion of the DC power supply. Therefore, while the system monitors changes in the ripple voltages such, in effect, monitors changes in the DC portion of the power supply. The ripple voltage is coupled through a scale switch and depending upon the setting of the scale switch through a particular branch of a divider circuit, generally designated by reference character 14, to the base electrode 15 of an input amplifying PNP coupled transistor 16. The emitter electrode 17 is coupled through lead 18 and an emitter resistor 19 to junction 20 interposed in lead 11. A collector electrode 21 is coupled to junction 22 coupled to the balanced circuit, generally designated by the reference character 23, so that any variations in the ripple voltage are amplified by the first amplifier 16 and supplied to the balanced through circuit junction 22. A back-biasing resistor 24 is connected between junction 25 which is coupled to junction 22 in the collector circuit and junction 26 which is coupled to the base electrode 15 of the transistor 16 so as to provide a back-biased voltage on the transistor in order that such will operate linearly responsive to changes in the ripple voltage.

The balanced circuit 23 included an output detector PNP transistor 28 which has its base electrode 29 coupled through lead 30, and a coupling capacitor 31 to junction 22 which is, in turn, connected to receive output signals from the input amplifying transistor 16. The emitter electrode 32 of transistor 28 is coupled through resistor 33 interposed in lead 34 to a wiper arm 35 of a balancing pot 36. One side of the balancing pot 36 is coupled to junction 37 interposed in lead 11. The purpose of balancing pot 36 is to place a back bias on transistor 28 so as to prevent current flow through transistor 28 when there is no signal on base electrode 29. The other side of the balancing pot 36 is coupled through lead 38 to one side of a dividing resistor 39. The other side of the dividing resistor 39 is coupled to junction 40 which is, in turn, coupled to junction 41, lead 42, junction 43 to one side of a microammeter 44. The other side of the microammeter 44 is connected through lead 45 to the collector electrode 46 of the transistor 28. A coupling resistor 47 is connected between a junction 48 interposed in lead 30 and junction 49 interposed in lead 11. Thus the balance circuit includes transistor 28, lead 34, resistor 33, balancing pot 36, lead 38, resistor 39, lead 42, microammeter 44 and lead 45.

Thus, any variations in the ripple voltage causes the output current of the first amplifying transistor to vary accordingly, which in turn, supplies a corresponding signal to the base electrode 29 of the detector transistor 28 interposed in the balanced circuit. This, in turn, causes the DC current to flow through the emitter electrode 32 and out the collector electrode 46 to vary the reading of the DC microammeter 44. Therefore, by observing the microammeter 44 any variations in the ripple variations in the ripple voltage, can be detected. As previously mentioned, by observing variations in the ripple voltage, such in turn, is an accurate indication as to the variations in the DC signal being monitored.

A load resistor 50 is interposed between junction 43 and junction 25 which is connected to the collector circuit of transistor 16. A source of power, generally designated by the reference character 51, is provided for the balanced circuit. This source of power included any suitable power supply, such as 115 volts, 60 cycle AC source 52 which is coupled between leads 53 and 54. One side of a primary winding 55 of a stepdown transformer 56 is coupled to a selector switch 57 which, in turn, may be connected to lead 58 which has normally open relay contacts K1-1 interposed therein. The other side of the relay contacts K1-1 is connected to junction 59 which, in turn, is connected to lead 54. The relay contacts K1-1 are operated by a relay K1 connected in shunt with the power supply being monitored between leads 10 and 11. The purpose in this arrangement it to prevent damage to the balanced circuit 23 when there is an open input across leads 10 and 11.

This also prevents the power supply 52 from being coupled to the transistors 16 and 28 when there is no DC power supply connected across leads 10 and 11 so that the voltage source 52 will not inadvertently peg the microammeter 44.

The selector switch 57 can be rotated to the test position wherein such is in contact with junction 59 to bypass the relay contacts K1-1 when it is desired to see if the power supply is operating properly and sometimes during the calibrating stage.

The other side of the primary winding 55 of the stepdown transformer 56 is coupled to one side of a voltage adjusting resistor 60 through lead 61. The adjusting resistor 60 is provided for setting the overall gain of the entire system. The other side of the secondary winding is connected to junction 62 which is, in turn, coupled through lead 63 and a limiting resistor 64, to the other side of the voltage-adjusting resistor 60 through lead 65. A "power-on" indicating lamp 66 is connected in shunt with the secondary winding 59 to indicate when there is power present. A wiper arm 67 associated with the voltage-adjusting resistor 60 is connected through lead 68 to an input terminal 69 of a full-wave rectifier bridge 70. The other input terminal 71 of the full-wave rectifier bridge 70 is coupled through lead 72 to junction 73 which is in turn connected to leads 63 and 65. Diode rectifiers 74, 75, 76 and 77 are each connected in a respective leg of the rectifier bridge for rectifying the AC signal being supplied thereto and converting such to a DC voltage between junctions 78 and 79. Junction 79 is in turn, connected through a filter network 80 to junction 40 interposed in the balanced circuit. Junction 78 is also connected through the filter network to the balanced circuit 23 at junction 41. Junction 79 is coupled through lead 81, junction 82, resistor 83, to junction 40. Junction 78 is also connected through the filter network to the balanced circuit 23 at junction 41. Junction 79 is coupled through lead 81, junction 82, resistor 83, to junction 40. Junction 78 is coupled through lead 84, junction 85, lead 86, junction 87, filter capacitor 88, lead 89, to junction 41 interposed in the balanced circuit 23. Another filter capacitor 90 is connected between junction 82 and junction 85. Junction 87 is also connected through lead 91 to junction 37 interposed in lead 11.

The divider circuit 14 is provided for allowing the microammeter 44 to operate on different scales, For example, when the scale switch 13 is connected to junction 92 the signal is supplied over lead 93 to base electrode 15 of the transistor 16. This allows a reading to take place on the 100-millivolt scale of the ammeter. When the scale switch is in the middle position connection to junction 94 it is on the 1-volt scale and is coupled through an adjusting divider, resistor 95 to junction 96 which is, in turn, connected to junction 97. The scale switch 13 can also be rotated to the 10-volt scale wherein, such is in contact with junction 98 connected to lead 99, resistor 100, variable resistor 101, and back to junction 96, which is, in turn, coupled to the base electrode 15 of transistor 16.

No variable resistor is necessary for the 100-millivolt circuit because such can be regulated with the balancing pot 36. Prior to connecting the power supply, which is to be monitored across leads 10 and 11, the switch 57 is turned to the test position wherein contact arm 57 makes connection with junction 59 so that the balancing circuit can be calibrated. This is accomplished by first adjusting the balancing pot 36 so that the microammeter 44 reads zero. The second adjustable means, which includes balancing resistor 60, is then adjusted so that the mircoammeter reads full scale. After the 100-millivolt circuit has been balanced the scale switch 13 is switched to the 1-volt branch and the calibrating resistor 95 is adjusted so that the microammeter 44 again reads zero for that particular scale. The scale switch 13 then is switched to the 10-volt branch and the adjustable resistor 101 is adjusted so that the microammeter 44 reads zero on the 10-volt scale.

After the three scales of the microammeter have been calibrated the power supply which is to be monitored is connected across leads 10 and 11 and the scale switch 13 is set so that the maximum changes are observed on the microammeter 44. Any changes in the rippled voltage causes the conduction of the first amplifying transistor 16 to change accordingly which, in turn, causes the conduction of the output amplifying transistor 28 to change a proportional amount. This causes the current flow through the microammeter to vary indicating the change and informing the operator of such deviatrons.

While a preferred embodiment of the invention has been described using specific terms, such description is for illustrative purposes only, and it is to be understood that changes and variations may be made without departing from the spirit or scope of the following claims:

We claim:

1. An electrical apparatus for determining variations in the amplitude of DC power supply by monitoring the ripple voltage associated therewith comprising:
   A. a balanced circuit,
   B. an isolation capacitor means interposed between said DC power supply and said balanced circuit for isolating a DC component of said power supply from said balanced circuit while passing the ripple voltage to said balanced circuit,
   C. a detector transistor, having base, emitter and collector electrodes, interposed in said balanced circuit, said base electrode being coupled to said isolation capacitor for receiving said ripple voltage.
   D. an ammeter connected between said emitter and collector electrodes for indicating changes in current flow through said balanced circuit responsive to variations in said ripple voltage being supplied to said base electrode,
   E. a source of power coupled to said balanced circuit,
   F. first adjustable means coupled to said source of power for setting the overall gain of said apparatus, and
   G. second adjustable means interposed in said balanced circuit for placing a back bias on said transistor,
   whereby variations in said DC power supply are detected by monitoring the ripple voltage associated therewith, which causes the conduction of said transistor to vary accordingly to produce a corresponding change in current flow in said balanced circuit.

2. The electrical apparatus as set forth in claim 1, further comprising:
   A. an amplifying transistor interposed between said isolation capacitor and said balancing circuit for amplifying said ripple voltage, and
   B. means for back biasing said amplifying transistor so that such operates substantially linearly.

3. THe electrical apparatus as set forth in claim 1, further comprising:
   A. a plurality of voltage-divider circuits interposed between said isolating capacitor and said balancing network for scaling down the ripple voltage passing therethrough, and
   B. a selector switch for selectively directing the flow of ripple voltage through a particular divider circuit so that changes in ripple voltage can be readily detected by said ammeter.

4. The electrical apparatus as set forth in claim 1, further comprising:
   A. a relay coupled to said power supply being monitored for being energized by said power supply,
   B. relay contacts interposed between said source of power and said balanced circuit for completing a circuit therebetween when said relay is energized by said power supply and disconnecting said source of power from said balanced circuit when said relay is deenergized.

5. The electrical apparatus as set forth in claim 1, wherein said source of power includes:
   A. an AC voltage source,
   B. a full-wave rectifier coupled to said AC voltage source for producing a DC voltage,
   C. means for coupling said DC voltage to said balance circuit for providing power thereto.

6. THe electrical apparatus as set forth in claim 5, wherein said first adjustable means includes:
   A. a variable resistor interposed between said AC voltage source and said full-wave rectifier.